Nov. 12, 1957    E. E. CRILE    2,812,868
LOADING AND UNLOADING DEVICE FOR TRUCKS
Filed Feb. 28, 1955    2 Sheets-Sheet 1

INVENTOR.
EUGENE E. CRILE.
BY
ATTORNEY.

Nov. 12, 1957   E. E. CRILE   2,812,868
LOADING AND UNLOADING DEVICE FOR TRUCKS
Filed Feb. 28, 1955   2 Sheets-Sheet 2
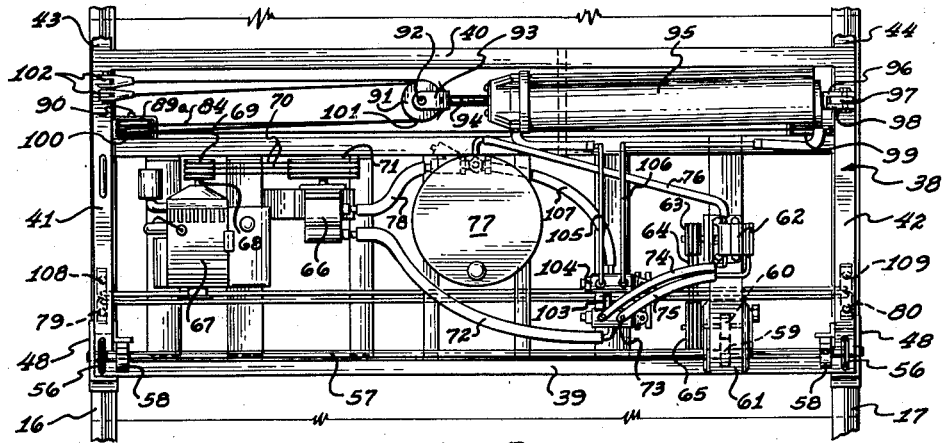
Fig. 2
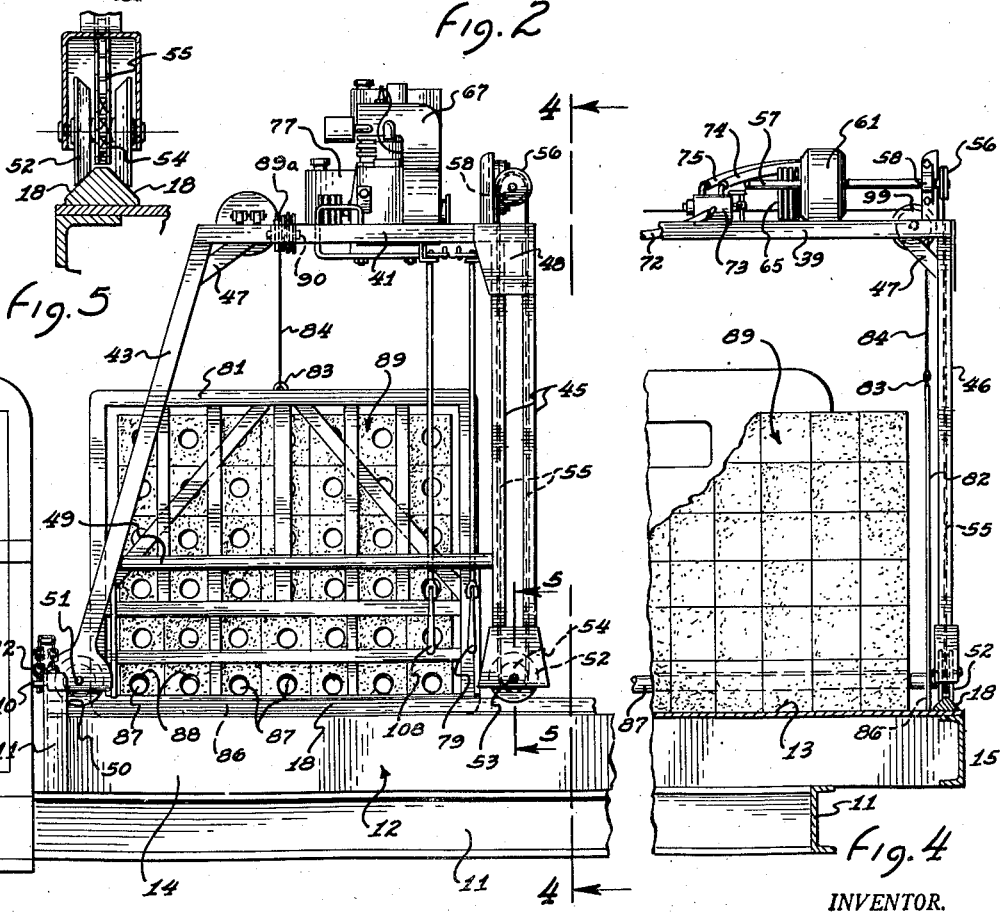
Fig. 5
Fig. 3
Fig. 4
INVENTOR.
EUGENE E. CRILE.
BY
Willard S. Growe
ATTORNEY.

United States Patent Office 2,812,868
Patented Nov. 12, 1957

2,812,868

LOADING AND UNLOADING DEVICE FOR TRUCKS

Eugene E. Crile, Phoenix, Ariz., assignor to Builders Equipment Company, a corporation of Arizona Application February 28, 1955, Serial No. 491,080

7 Claims. (Cl. 214—75)

This invention pertains to improvements in loading and unloading devices for trucks and is particularly adapted to an improved device for the manipulation and handling of precast cement blocks, bricks, and the like, to and from the load-carrying bed of a truck.

One of the objects of this invention is to provide an improved loading and unloading device for trucks which is simple in construction and efficient in operation so as to require a minimum of time to get the job done with a minimum of labor involved.

Still another object of this invention is to provide an improved loading and unloading device for truck which is capable of power operation for placing loads from the ground surface on the truck bed and for removing the same therefrom in a prompt and efficient manner.

Still another object of this invention is to provide a loading and unloading device for a truck which is light in weight and requires a minimum of structural materials while being capable of handling the full capacity load of the vehicle.

Still another object of this invention is to provide an improved loading and unloading device for trucks which has low head room and in no wise interferes with the full capacity load to be carried on the truck.

Still another object of this invention is to provide an improved loading and unloading device for trucks capable of handling the heaviest and largest loads of the vehicle but which is at the same time relatively light in weight so as to cut down the dead weight loss of pay load on the vehicle.

Still another object of this invention is to provide an improved loading and unloading device for a truck which is adapted to be moved longitudinally of the truck bed and to a point at the rear beyond the truck bed on extension rail means which gets their primary support from the truck bed and the ground surface from which and upon which the loads are deposited relative to the truck bed.

Still another object of this invention is to provide an improved loading and unloading device for trucks which takes a minimum of space on the truck body and maintains the normal length for the truck bed when transporting the loads on the truck to desired sites.

Further features and advantages of this invention will appear from a detailed description of the drawings in which:

Fig. 2 is an enlarged fragmentary plan view of the device shown in Fig. 1.

Fig. 3 is an enlarged fragmentary side elevation of the device shown in Fig. 1.

Fig. 4 is an enlarged fragmentary section on the line 4—4 of Fig. 3.

Fig. 5 is an enlarged section on the line 5—5 of Fig. 3.

Figure 1:
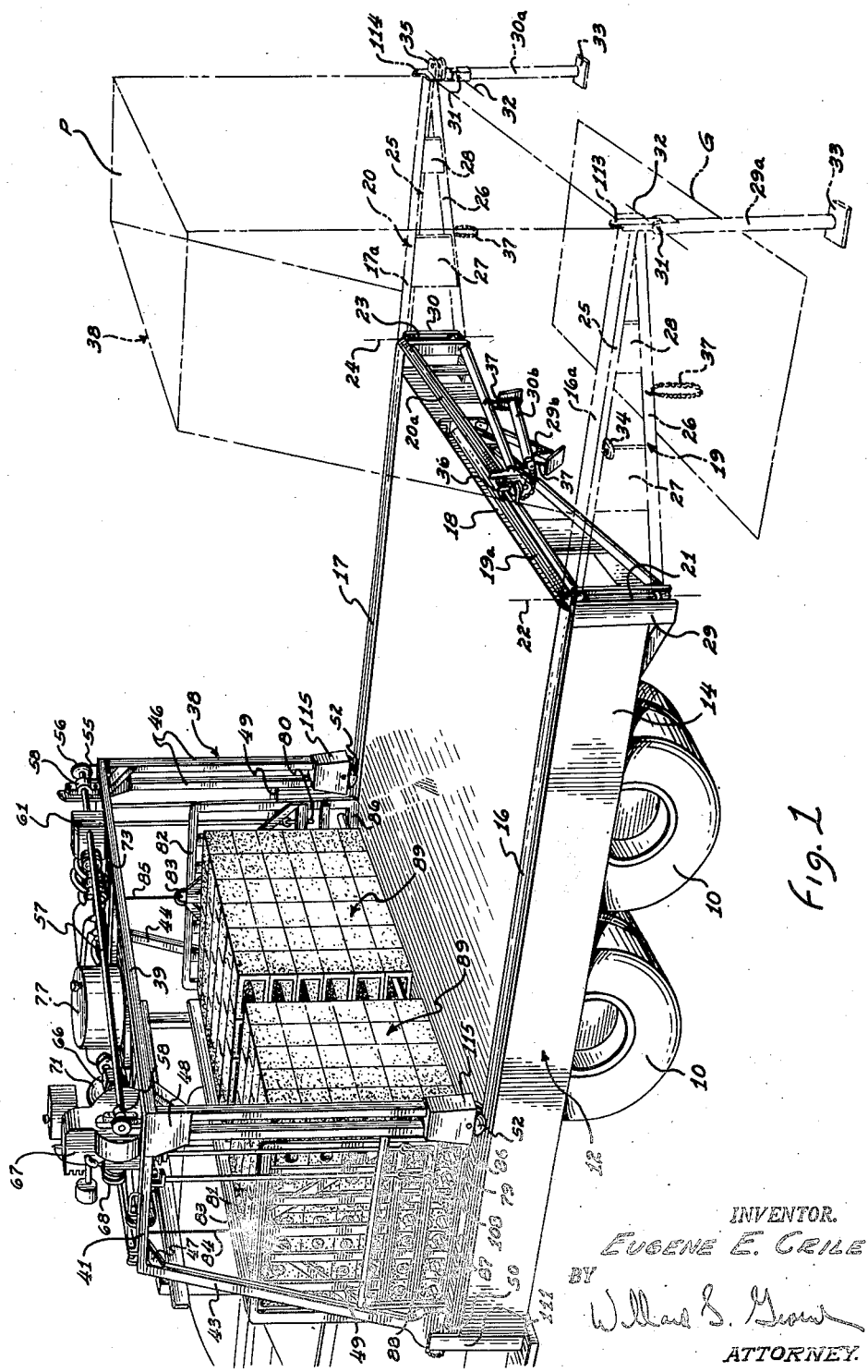
Fig. 1 is a general fragmentary perspective view of a truck or similar motor vehicle incorporating the features of this invention.

As an example of one embodiment of this invention there is shown a truck having road wheels 10 and a chassis or frame 11 suitably mounted on said road wheels. A bed 12 is fixed to the frame 12 and has a top or deck 13 and side channels 14 and 15 along the top edges of which are fixed the rails 16 and 17.

To the rear portion 18 of the bed 12 are mounted the two horizontally swinging rail extension members 19 and 20, the rail extension member 19 being mounted on a suitable hinge pin 21 carried on the truck bed so that the extension rail 19 swings around a vertical axis 22. The horizontal swinging extension member 20 is mounted on a suitable hinge pin 23 on the rear portion 18 of the truck bed for swinging around the vertical axis 24. Each of these extension members 19 and 20 comprises the top rail supporting piece 25 and the bottom truss member 26 suitably secured together rigidly by the gusset plates 27 and 28. Rigidly fixed to the top rail supporting pieces 25 are the extension rails 16a and 17a of identically the same cross section as that shown in Fig. 5 as that of the corresponding rails 16 and 17 rigidly fixed on the truck bed 12. Stop pieces 29 and 30 accurately limit the outward swinging motion of the members 19 and 20 to precise alignment of the respective extension rails 16a and 17a with the respective rails 16 and 17 as shown in broken line position in Fig. 1.

On the outer ends of the rail extension members 19 and 20 is carried the support posts or jacks 29a and 30a, each pivotally connected by a suitable pin 31 located on horizontal transverse axes 32 and having ground abutment plates 33. These jacks 29 and 30 therefore directly support the outer ends of the extension rail members 19 and 20 through their abutment plates 33 directly against the ground surface.

It is important to note that the axis 22 of the hinge pin 21 for the extension rail member 19 is closely located up against the rear portion 18 of the truck bed 12 but that the axis 24 of the hinge pin 23 sets back rearwardly from the rear portion 18 of the truck substantially a distance equal to the thickness or sidewise width of the extension member 19. By this arrangement the extension member 19 may be folded back to the position 19a against the rear portion 18 of the truck bed. The extension rail member 20 then is folded back against the member 19 as best shown at 20a in full line in Fig. 1. The top rail support piece 25 of the extension rail member 19 is provided with a lug 34 which enters between the bifurcated lug 35 on the outer end of the extension rail member 20 and a suitable lock pin 36 is passed through holes in the lug 34 and bifurcated lug 35 so as to securely and positively hold the extension members 19 and 20 in folded up position shown in full line in Fig. 1. The jack members 29a and 30a are swung up to the positions 29a and 30a in full line in Fig. 1 and secured by the looped chains 37 to the bottom truss members 26 ready for road travelling position.

The lifting and transporting carriage indicated generally at 38 comprises a frame structure consisting of the transverse rail members 39 and 40 which are connected together at their ends by the side members 41 and 42. The frame is rigidly fixed to the forwardly sloping front legs 43 and 44 and to the vertically disposed double rear legs 45 and 46. Suitable gusset plates 47 and 48 secure the frame rigidly to the downwardly extending legs and a tie bar 49 is interconnected between the lower portions of the legs 43—45 and 44—46. Spool-shape rollers 50 are journaled on suitable shafts 51 on the lower ends of the front sloping legs 43 and 44 and these rollers have suitable angular contact surfaces riding in guided relationship on the surfaces 18 of the tracks 16 and 17 and the extension tracks 16a and 17a. The rear legs are also provided with rollers 52 on suitable shafts 53 but these spool-shape rollers have formed between their angular surfaces a driven sprocket 54 over which is applied a drive chain 55 which chains for each roller 52 are connected over sprockets 56 fixed on each end of a horizontal transverse shaft 57 suitably journaled in bearings 58 carried in the top frame 41—42 of the carriage 38. The shaft 57 is driven through gearing 59 and 60 in a suitable gear reduction box 61 from a hydraulic motor 62 mounted on the carriage 38. The hydraulic motor 62 has an output pulley 63 which drives a belt 64 which in turn drives the input pulley 65 of the gear box 61 to apply power from the hydraulic motor 62 to rotate the shaft 57.

Fluid pressure for actuating the fluid pressure motor 62 is derived from the fluid pressure pump 66 which is driven from a suitable internal combustion engine 67 having an output shaft 68 and an output pulley 69, driving belts 70 which in turn drive the input pulley 71 of the fluid pressure pump 66. Pressure discharge from the fluid pressure pump 66 is delivered through the pressure line 72 which is connected to the reversing control valve 73 so that fluid pressure may be directed upon appropriate manipulation of the valve 73 through the pressure line 74 connected to the hydraulic motor 62 for one direction of rotation of the motor 62 or through the pressure supply line 75 for the opposite direction of rotation of the fluid pressure motor 62, the discharge flow from the hydraulic motor 62 passing out through the drain return line 76 to the fluid reservoir 77. The hydraulic pump 66 receives a supply of hydraulic fluid through a line 78 from the reservoir 77. Thus, with the internal combustion engine 67 operating the manipulation of the valve 73 causes reversible rotation as desired for the hydraulic motor 62 and through the drive train described rotates the spool-shape rollers 52 to affect the traversing or movement of the carriage 38 along the rails 16 and 17 and 16a and 17a relative to the truck bed. Suitable control levers 79 and 80 on each side of the carriage located convenient to an operator may be manipulated to control the valve 73 as above described.

An elevating mechanism is provided for raising and lowering stacks of building blocks or the like and they comprise two end frames 81 and 82 suitably fabricated of structural materials to form a rigid frame structure having an eyelet 83 connected to the respective lifting cables 84 and 85. The lower ends of these frames have horizontal bar portions 86 which engage the under sides of the lifting bars 87 which are passed through holes 88 in the building blocks 89 as they are stacked in cubical piles best shown in Figs. 1 and 3. A lifting cable 84 goes up over an idler pulley 89a journaled on a suitable pin 90 secured to the side member 41 and then proceeds horizontally toward the center of the frame and over a pulley 91 journaled on a pin 92 carried on the bifurcated end 93 on the end of the piston rod 94 of the elevating cylinder 95. The rear end of the cylinder 95 has a forked integral portion 96 which is secured by suitable bolt 97 to a bracket 98 rigidly secured to the side member 42 of the carriage 38. The lifting cable 85 extends upwardly and over the idler pulley 99 then over the idler pulley 100 and back over a pulley 101 journaled on the same pin 92 and the pulley 91 on the end of the piston rod 94. Both of the cables 84 and 85 coming over the pulleys 91 and 101 on the outer end of the piston rod 94 deadhead by suitable eyebolt clamp means 102 rigidly connected to the side member 41 of the frame 38.

Fluid pressure for actuating the cylinder 95 is derived from the same hydraulic pump 66 through the line 72 which is connected through a line 103 connected to the reversing control valve 104 which has lines 105 and 106 respectively connected to the piston rod end and the cylinder head end of the lifting cylinder 95. Drain return from the reversing valve 104 passes out through the drain return line 107 to the fluid reservoir tank 77. The elevating reversing control valve 104 is controlled by suitable means from the control levers 108 and 109 so that by their manipulation, with the internal combustion engine 67 operating, fluid pressure may be applied in the cylinder 95 to reciprocate the piston rod 94. When the piston rod is drawn into the cylinder the cables 84 and 85 are raised lifting the side frames so that their bottom rails 86 engage under the lifting bars 87 and cause the stacks 89 of building materials to be raised up off of the truck bed floor. Reversing the valve 104 to apply pressure in the piston head end of the cylinder will cause the piston rod 94 to be extended thus releasing the cables and allowing the load to be lowered.

In operating the loading and unloading device, the carriage 38 is rolled out to the pickup and discharge position P on the extension rails 19 and 20 as best shown in broken line position in Fig. 1. Stop means 113 and 114 on the outer ends of the extension rails 16a and 17a engage the lower portions 115 of the double rear legs 45 and 46 so as to limit the outward travel of the carriage 38 to the position shown. When in this position a mass of blocks has been previously located on the ground at the point G and are stacked up in such a manner that the lifting bars 87 may be inserted through the lower layer of blocks. The fluid pressure cylinder 95 is then energized to extend its piston rod 94 by appropriate manipulation of the control levers 108 and 109 as described. With the side frames 81 down with their horizontal bar portions 86 on the ground they are then shifted under the lifting bars 87 as best seen in Figs. 1 and 3. The cylinder 95 is then energized to draw in its piston rod 94 and thereby raise the load up to the raised position of the carriage, a position slightly above the top or deck 13 of the truck. The operator then manipulates either lever 108 or 109 energizing the fluid pressure motor 62 to cause the operation of the rollers 52 which in turn traverses the carriage with its suspended load forwardly over the truck bed to such a point such as shown in full line in Fig. 1. The carriage is then traversed back and the side frames 81 again lowered and the bars from the previous load deposited on the truck again placed in the new stack on the ground at G. This operation continues until all of the block stacks have been loaded and completely on the truck body, the last load being placed at the end of the rear portion of the truck bed and the crane device may remain in its normal pickup position but preferably has lowered the load on to the truck bed. The extension rails 19 and 20 are then folded back and locked into traveling position as described and the truck is off to the job.

When it arrives at the job the reverse process takes place by first positioning the extension rails as described and then moving the carriage by power out on these rails and by power to lower the load. The truck, of course, may be driven to different positions for each load or it is possible to stack one group on top of the other with this device for conservation of space. When the truck has been completely emptied the carriage is moved to completely forward position where lugs 110 on the front ends of the lower portion of the front sloping legs 43 extend through suitable holes in the front stop members 111 and a suitable locking pin 112 is passed through a hole in the lug to securely lock the carriage when empty in position on the truck.

It is most important to note that the carriage in no wise interferes with the normal use of the truck as it may be easily picked up and set aside if certain special pieces of apparatus other than the hauling of masonry elements is to be undertaken. Further, it will be noted that even with the carriage on the truck it in no wise interferes with the normal load carrying capacity of the truck. Also, the structure is of extremely light weight for its capacity to lift because the lifting cable means 84 and 85 are directly adjacent to the side frame members formed by the legs 43—45 and 44—46 and there is no overhung or load which needs to be carried on trusses or beams or trolleys of any kind. Furthermore, it is important to note that the extension rails fold around vertical axes in a horizontal plane back against the rear portion of the truck so that they interfere in no wise whatsoever with the normal use of the flat bed of the truck and do not in any substantial way at all extend the overall length of the truck when not in use. Further, these extension rails are adapted to be supported at their outer ends directly on the ground by apparatus carried on the outer ends thereof so that actually the load of the carriage with the spaced wheel structures 50 and 52 are respectively carried on substantially the rear edge of the truck bed or directly over the support posts or jacks 29 and 30 so that the extension structures 19 and 20 do not have to be of any special heavy structural capacity. It is also to be noted that by the automatic power operation of the various functions under operator control standing down at the side of the unit closely adjacent to the position he normally occupies, the operator slips the lifting bars in or removes them from the work with a very minimum of effort, time, and labor. Besides it is absolutely safe for the operator as he is in no wise near any suspended materials during the operation of the device. It is also to be noted that in view of the light weight for the maximum capacity due to the unique design of the carriage and the extension rails that the deadweight loss of the auxiliary equipment on the truck is substantially eliminated and therefore the pay load can be used to its fullest capacity and intent.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters patent is:

1. In a loading and unloading device for a truck having, a bed including a load carrying deck, a pair of transversely spaced rails fixed along each side edge of said deck and terminating at the rear portion of said deck, a pair of transversely spaced extension rails hinged for horizontal swinging movement on said rear portion of said deck to swing about vertical axes lying substantially in planes passing through said spaced rails fixed along each side edge of said deck so that the outer ends of said extension rails swing inwardly to an intermediate position relative to the transverse length of said rear portion of said deck whereby one of said extension rails may be folded over the other extension rail when folded back against said rear portion, said extension rails being adapted to swing outwardly and rearwardly to aligned position with said rails fixed along each side edge of said deck, means on the outer ends of said extension rails adapted to engage the ground surface to support the outer ends of said rails when in outward aligned position with the rails on said deck, a loading and unloading device including a carriage, rollers on the bottom of said carriage riding on said fixed and extension rails, a load carrying frame suspended on said carriage, and means on said carriage for raising and lowering said load carrying frame relative to said deck and between the inside faces of said extended extension rails when said carriage is traversed out on said extension rails.

2. A loading and unloading device for a flat bed truck comprising, a pair of rails fixed longitudinally along each edge of said bed, horizontally inwardly swingable extension rails hinged for horizontal swinging movement on said deck to swing about vertical axes lying substantially in planes passing through said fixed rails on said bed adjacent the rear ends of said fixed rails so that the outer ends of said extension rails swing inwardly to an intermediate position relative to the transverse distance between said fixed rails whereby one of said extension rails may be folded over the other extension rail, said extension rails being adapted to swing outwardly to aligned position with said fixed rails to provide an unimpeded space between, above, below and to the rear of said extension rails when extended, a carriage mounted to roll on top of said fixed and extension rails, a load engaging frame mounted on said carriage, power means on said carriage including manually operated control elements for traversing said carriage on said fixed and extension rails and for raising and lowering said load engaging frame on said carriage relative to said bed and between the inner faces of said extended extension rails relative to the ground surface in the space between said extension rails.

3. A loading and unloading device for a flat bed truck comprising, a pair of transversely spaced fixed rails fixed along each edge of said bed, extension rails hinged on the rear end of said bed to swing out vertical axes lying substantially in vertical planes passing through said rails fixed along each edge of said bed and adjacent the rear ends of said fixed rails, said extension rails being adapted to swing outwardly to aligned position with said fixed rails to provide an unimpeded space between and to the rear of said extension rails, a carriage mounted to roll on top of said fixed and extension rails when extended, a load engaging frame mounted on said carriage, power means on said carriage including manually operated control elements for traversing said carriage on said fixed extension rails and for raising and lowering said load engaging frame on said carriage relative to said bed and between said extension rails relative to the ground surface in the space between said extension rails, ground engaging jacks, one for each extension rail, pivotally mounted on the outer ends thereof for swinging about horizontal axes located at right angles to said extension rails, and ground contacting abutment plates on the outer ends of said jacks.

4. A loading and unloading device for a truck having a bed, a deck on top of said bed to receive a work load, rails fixed along each side edge of said deck, a pair of horizontally swinging extension rails, one for each of said fixed rails, pivotally mounted on vertically disposed hinge pins on said bed adjacent the rear ends of said fixed rails so that said extension rails may be folded inwardly against the rear of said bed from an extended aligned position with said fixed rails, one of said hinge pins being located further to the rear of said bed than the other so that one extension rail may fold back over the other in parallel retracted position on the rear of said bed.

5. A loading and unloading device for a truck having a bed, a deck on top of said bed to receive a work load, rails fixed along each side edge of said deck, a pair of extension rails, one for each of said fixed rails, pivotally mounted on vertically disposed hinge pins on said bed adjacent the rear ends of said fixed rails so that said extension rails may be folded back against the rear of said bed from an extended aligned position with said fixed rails, one of said hinge pins being located further to the rear of said bed than the other so that one extension rail may fold back over the other in parallel retracted position on the rear of said bed, lug means intermediate the length of the extension rail folded directly against the rear of said bed, cooperating lug means on the outer end of the other extension rail folded over said first folded rail, and locking pin means interengaging both of said lugs to secure said extension rails in folded position against the rear of said bed.

6. A loading and unloading device for a truck having a bed, a deck on top of said bed to receive a work load, rails fixed along each side edge of said deck, a pair of extension rails, one for each of said fixed rails, pivotally mounted on vertically disposed hinge pins on said bed adjacent the rear ends of said fixed rails so that said extension rails may be folded back against the rear of said bed from an extended aligned position with said fixed rails, one of said hinge pins being located further to the rear of said bed than the other so that one extension rail may fold back over the other in parallel retracted position on the rear of said bed, lug means intermediate the length of the extension rail folded directly against the rear of said bed, cooperating lug means on the outer end of the other extension rail folded over said first folded rail, and locking pin means interengaging both of said lugs to secure said extension rails in folded position against the rear of said bed, a pair of support jacks, one for each of said extension rails, means for pivotally mounting said jacks on the outer ends of said extension arms including horizontally disposed pivot pins located at right angles to said extension rails, and means for securing said jacks to the underside of said extension rails when swung from vertical load supporting position for the outer ends of said extension rails to substantially horizontal road traveling position.

7. In a loading and unloading device for a truck having a bed, a deck on top of said bed, horizontally swinging extension rails on the rear of said bed adapted to be swung outwardly to alignment with a pair of fixed rails located along the sides of said deck, a work handling carriage comprising transverse members and side members forming a power unit frame above the work to be handled, legs depending from said power unit frame having rollers running on said fixed and swinging rails, load lifting side frames located adjacent the inside faces of said legs and said swinging extension rails when the latter are in extended position including means to engage a load to be lifted, power means on said power unit frame adapted to drive said rollers to traverse said carriage on said fixed and swinging rails, and further power means on said power unit frame to vertically reciprocate said load lifting side frames, said load lifting side frames being positioned so as to pass down between said extension rails and the sides of a load to be lifted when said carriage is traversed out on said extended extension rails.

References Cited in the file of this patent

UNITED STATES PATENTS

| | | |
|---|---|---|
| 701,906 | Lutz | June 10, 1902 |
| 2,045,566 | Berg | June 30, 1936 |
| 2,088,122 | Taylor | July 27, 1937 |
| 2,304,622 | Barrett | Dec. 8, 1942 |
| 2,605,914 | Hala | Aug. 5, 1952 |
| 2,701,655 | Crile | Feb. 8, 1955 |
| 2,746,619 | Kuhlenschmidt et al. | May 22, 1956 |